US012693616B2

(12) United States Patent
Nishimura

(10) Patent No.: US 12,693,616 B2
(45) Date of Patent: Jul. 28, 2026

(54) HEATING DEVICE AND IMAGE FORMING APPARATUS HAVING A HEATING DEVICE WITH FIRST AND SECOND MODES

(71) Applicant: CANON KABUSHIKI KAISHA, Tokyo (JP)

(72) Inventor: Shizuma Nishimura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/582,499

(22) Filed: Feb. 20, 2024

(65) Prior Publication Data

US 2024/0329575 A1 Oct. 3, 2024

(30) Foreign Application Priority Data

Mar. 28, 2023 (JP) ................................. 2023-052317

(51) Int. Cl.
*G03G 15/20* (2006.01)

(52) U.S. Cl.
CPC ....... *G03G 15/205* (2013.01); *G03G 15/2064* (2013.01); *G03G 2215/00772* (2013.01)

(58) Field of Classification Search
CPC ............. G03G 15/205; G03G 15/2046; G03G 15/2042
See application file for complete search history.

(56) References Cited

U.S. PATENT DOCUMENTS 8,554,098 B2 * 10/2013 Nishiyama ......... G03G 15/2039 399/69
10,303,095 B2 * 5/2019 Takagi ............... G03G 15/2042
2005/0214044 A1 9/2005 Sakakibara et al.
2006/0051117 A1 * 3/2006 Nishida .............. G03G 15/2046 399/69
2015/0055968 A1 * 2/2015 Kadowaki ............ G03G 15/205 399/69
2016/0026132 A1 1/2016 Hirai et al.
2018/0088499 A1 3/2018 Inada et al.
2022/0206416 A1 6/2022 Nishimura
2023/0324834 A1 10/2023 Nishimura et al.

FOREIGN PATENT DOCUMENTS

JP H10-177319 6/1998
JP 2000-206811 7/2000
JP 2019053164 A * 4/2019

* cited by examiner

*Primary Examiner* — Arlene Heredia Ocasio
(74) *Attorney, Agent, or Firm* — Venable LLP

(57) ABSTRACT

A heating device includes first and second heat generating members, and first and second thermistors. A controller is capable of switching the heating device to a first mode in which the temperature of the first heat generating member is controlled based on the detecting result of the first thermistor and the temperature of the second heat generating member is controlled depending on control of the first heat generating member, and a second mode in which the temperature of the first heat generating member is controlled based on the detecting result of the first thermistor and the temperature of the second heat generating member is independently controlled based on the detecting result of the second thermistor. The controller switches to the first mode during the recording material is passing through a nip portion, and switches to the second mode during the recording material is not passing through the nip portion.

9 Claims, 5 Drawing Sheets

HEATING DEVICE AND IMAGE FORMING APPARATUS HAVING A HEATING DEVICE WITH FIRST AND SECOND MODES

FIELD OF THE INVENTION AND RELATED ART

The present invention relates to a heating device and an image forming apparatus.

As the heating device mounted on the image forming apparatus, the heating device of a film heating method, which is excel in electric power saving, are widely used. As such a heating device, for example, the heating device described in Japanese Patent Application Laid-Open No. H10-177319 uses a heater constituted by a plurality of resistance heat generating member having different heating distribution in a longitudinal direction and switches electric power supply ratio to the resistance heat generating elements. By this, it is intended to change temperature distribution in the longitudinal direction and suppress rise in temperature in a non-paper passing portion upon printing a small-size paper. The switching of the electric power supply ratio to the plurality of the resistance heat generating members is performed by selecting a predetermined electric power supply ratio corresponding to width information of a recording material.

However, it is unclear, in prior arts, how it is controlled in a case in which the width information of the recording material is not available, etc., such as during an idle rotation state of the heating device in an interval of the recording materials (paper interval) in a state in which a plurality of the recording materials are conveyed.

The present invention is conceived under such a situation, and an object of the present invention is to maintain temperature distribution in a longitudinal direction of a heater uniform even when width information of a recording material is not available.

SUMMARY OF THE INVENTION

The present invention includes the following configuration.

A heating device comprising: a rotatable film; a heater provided inside the film and including a first heat generating member and a second heat generating member of which heating distribution is different from that of the first heat generating member in a longitudinal direction; a pressing roller configured to form a nip portion, with the heater through the film, in which a toner image formed on a recording material is heated to be fixed on the recording material; a first thermistor and a second thermistor provided at different positions and configured to detect a temperature of the heater; and a controller configured to control the temperature of the heater based on detecting results of the first thermistor and the second thermistor, wherein the heating device is capable of switching (1) a first mode in which the temperature of the first heat generating member is controlled based on the detecting result of the first thermistor and the temperature of the second heat generating member is controlled depending on control of the first heat generating member, and (2) a second mode in which the temperature of the first heat generating member is controlled based on the detecting result of the first thermistor and the temperature of the second heat generating member is independently controlled based on the detecting result of the second thermistor, and wherein the controller switches to the first mode during the recording material is passing through the nip portion, and switches to the second mode during a period from when a trailing end of a recording material precedingly conveyed passes through the nip portion until when a leading end of a subsequent recording material passes through the nip portion.

According to the present invention, it becomes possible to maintain temperature distribution in a longitudinal direction of a heater uniform even when width information of a recording material is not available.

Further features of the present invention will become apparent from the following description of exemplary embodiments with reference to the attached drawings.

DESCRIPTION OF THE EMBODIMENTS

Hereinafter, Embodiments for implementing the present invention will be described in detail with reference to the drawings.

Embodiment

1. Configuration of an Image Forming Apparatus

Figure 1:
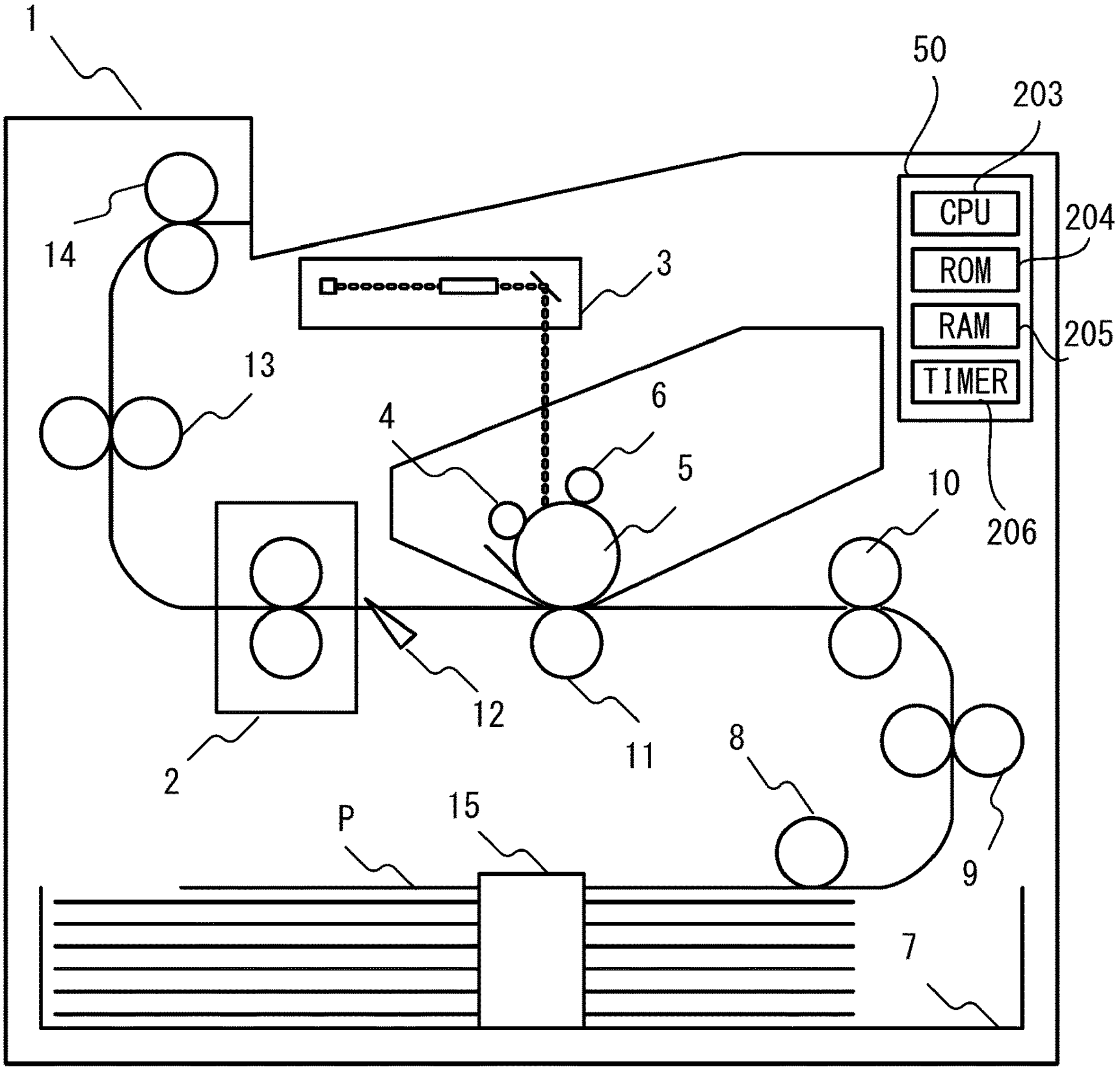
FIG. 1 is a cross-sectional view of an image forming apparatus of an Embodiment.

FIG. 1 is a cross-sectional view of an image forming apparatus of the present Embodiment. The image forming apparatus 1 shown in FIG. 1 is a laser printer which forms an image on a recording material P using an electrophotographic method. When the image forming apparatus 1 receives a print signal, a scanner unit 3 emits a laser beam modulated corresponding to the image information, and the laser beam scans a surface of a photosensitive drum 5, which is charged to a predetermined polarity by a charging roller 4. By this, an electrostatic latent image is formed on the photosensitive drum 5. By toner being supplied from a developing roller 6 to the electrostatic latent image, the electrostatic latent image on the photosensitive drum 5 is developed as a toner image.

Meanwhile, the recording material P stacked (accommodated) in a sheet feeding cassette 7 (cassette) is fed one sheet at a time by a pickup roller 8 and is conveyed toward a registration roller pair 10 by a conveyance roller pair 9. On a side plate of the sheet feeding cassette 7, a width sensor 15, which is a width detecting means for detecting a width of the recording material P, is disposed, and a detecting result of the width sensor 15 is reflected in a control of a heating device 2. The width sensor 15 is connected to a CPU 203, which will be described below, and the detecting result of the width sensor 15, i.e., width information of the recording material P, is output to the CPU 203. By this, the CPU 203 acquires the width information of the recording material P. Incidentally, a configuration of the width sensor 15 is well known and description thereof will be omitted.

In accordance with a timing when the toner image on the photosensitive drum 5 reaches a transfer position, which is formed by the photosensitive drum 5 and a transfer roller 11, the recording material P is conveyed from the registration roller pair 10 to the transfer position. The toner image on the photosensitive drum 5 is then transferred to the recording material P in a process in which the recording material P is passing through the transfer position. The scanner unit 3, the charging roller 4, the photosensitive drum 5, the developing roller 6 and the transfer roller 11 are included in image forming means.

A flag 12, which is a recording material detecting means, is a sensor, which is provided upstream of the heating device 2 in a conveyance direction and detects presence or absence of the recording material P, and detects a timing when the recording material P enters the heating device 2 with a mechanism in which the flag falls when the recording material P passes through. The flag 12 falls when a leading end of the recording material P reaches, remains fallen during the passing through of the recording material P, and returns to an original position thereof when a trailing end of the recording material P passes through. The flag 12 outputs different signals to the CPU 203, which will be described below, when the recording material P is passing through and when the recording material P is not passing through. The CPU 203 controls the heating device 2 based on the detecting result of the flag 12. At a detection timing of the flag 12, the recording material P is heated by the heating device 2, and an unfixed toner image is fixed onto the recording material P. The recording material P carrying the fixed toner image is discharged to a tray on an upper portion of the image forming apparatus 1 by conveyance roller pairs 13 and 14.

The image forming apparatus 1 of the present Embodiment has a maximum sheet-passing width of 297 mm in a direction perpendicular to the conveyance direction of the recording material (widthwise direction), and is capable of printing the recording material P of A4 size up to 40 sheets per minute. Incidentally, the maximum sheet-passing width refers to a width of the recording material P having the greatest width among the recording materials P which can be printed by the image forming apparatus 1.

The image forming apparatus 1 is provided with a control portion 50. The control portion 50 includes the CPU 203 (central processing unit), a ROM 204 (read only memory), a RAM 205 (random-access memory) and a timer 206. The control portion 50 controls the image forming apparatus 1 by executing programs stored in the ROM 204 in advance by the CPU 203 while using the RAM 205 as a temporary work area. The control portion 50 performs various timing controls while using the timer 206 upon performing the control of the image forming apparatus 1. Incidentally, the control portion 50 may be provided with an ASIC (application-specific integrated circuit) or a MPU (micro processing unit). In addition, as a storage media, other storage media such as a hard disk, an optical disk may be used.

2. Configuration of the Heating Device

Figure 2:
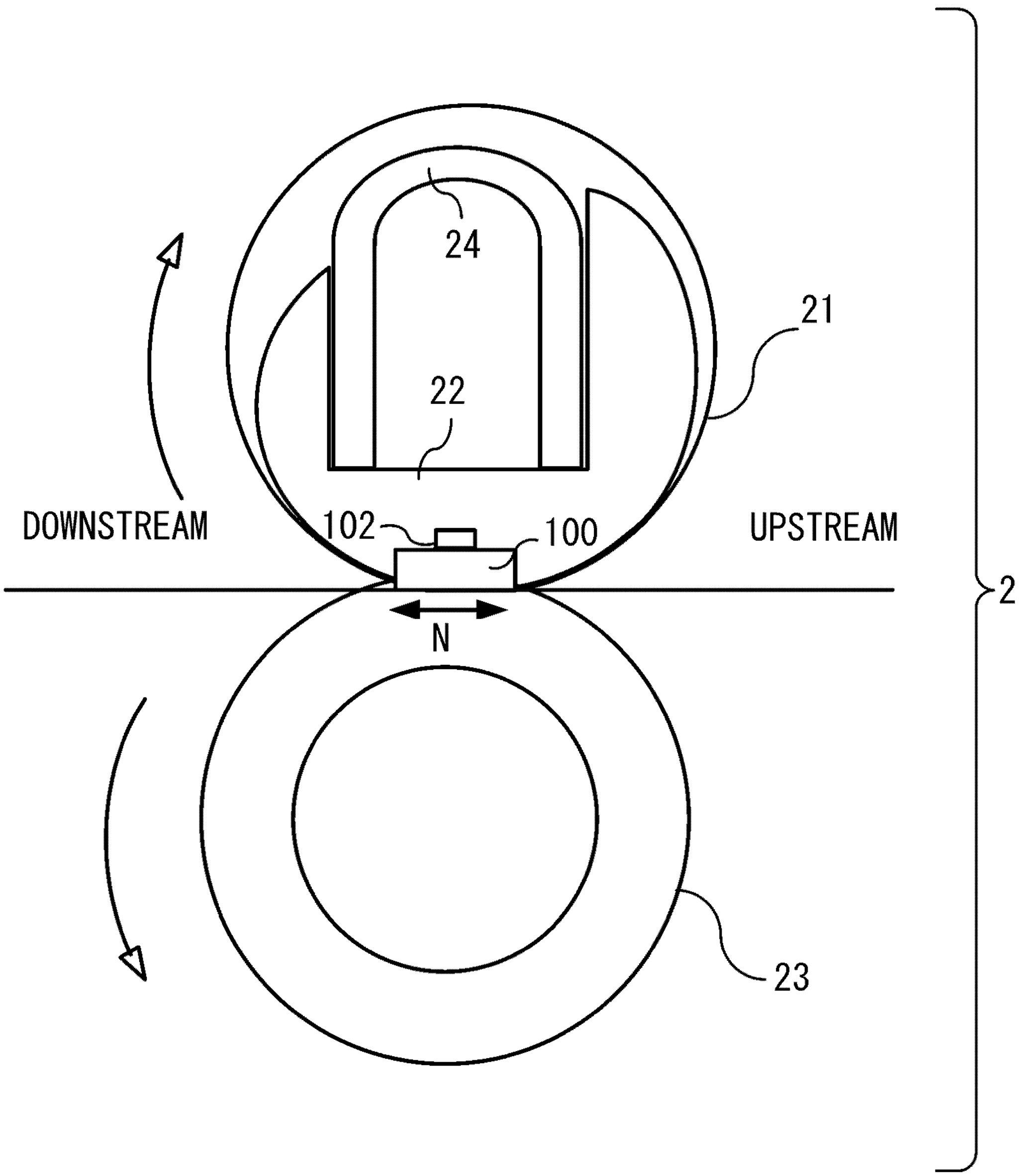
FIG. 2 is a cross-sectional view of a heating device of the Embodiment.

FIG. 2 is a cross-sectional view of the heating device 2 of the present Embodiment. The heating device 2 is provided with a film 21, a heater 100, a film guide 22, a pressing roller 23 and a metal stay 24. The film 21 is an endless film which rotates around an outside of the heater 100. The heater 100 is a heating member which contacts an inner surface of the film 21. The film guide 22 guides the film 21 while insulating and supporting the heater 100. The pressing roller 23 is in pressure contact with the film 21 and forms a fixing nip portion N (nip portion) together with the heater 100 via the film 21. The metal stay 24 presses the film guide 22.

The film 21 is a heat-resistant film formed in a cylindrical shape, and has a base layer made of heat-resistant resin such as polyimide. In addition, on a surface of the film 21, in order to prevent adhesion of the toner and to ensure separatability with the recording material P, a releasing layer, which is coated with heat-resistant resin having excellent releasing property, is formed. To improve image quality, a heat-resistant rubber such as silicone rubber may be formed as an elastic layer between the base layer and the releasing layer. The film 21 of the present Embodiment has an outer diameter of 24 mm.

The heater 100 is a ceramic heater having low thermal capacity, and on a substrate thereof, a resistance heat generating member is formed. On an opposite side of the fixing nip portion N of the heater 100, a thermistor 102, which is a temperature detecting means, is disposed. The control portion 50 controls electric power to be supplied to the heater 100 based on temperature detected by the thermistor 102 (hereinafter, referred to as detected temperature). The film guide 22 is constituted by heat-resistant resin such as liquid crystal polymer, or composite material of the resin and ceramics, glass, etc.

The heater 100 is fixedly supported on the film guide 22, and a peripheral length of the film guide 22 including the heater 100 is configured to be smaller than an inner peripheral length of the film 21. Thus, the film 21 is fitted externally with large margin to the film guide 22 including the heater 100. The pressing roller 23 includes an elastic layer such as silicone rubber on a core metal such as iron or SUS (Steel Special Use Stainless). In addition, a surface of the pressing roller 23 is coated with heat-resistant resin having excellent releasing property to prevent the toner adhesion. In the present Embodiment, an outer diameter of the pressing roller 23 is 25 mm.

The metal stay 24 is a metal plate bent in U-shape and urges the film guide 22 including the heater 100 toward the pressing roller 23 side with predetermined pressuring force. As a result, the film 21 is in pressure contact with the pressing roller 23, and the fixing nip portion N is formed between the film 21 and the pressing roller 23.

The pressing roller 23 rotates in a direction of an arrow in FIG. 2 by receiving power from a motor (not shown). As the pressing roller 23 rotates, the film 21 is driven to rotate in a direction of an arrow in FIG. 2. The unfixed toner image on the record material P is fixed by the heating device 2 giving heat of the heater 100 while nipping and conveying the record material P from upstream to downstream (right to left in FIG. 2) in the fixing nip portion N.

3. Configuration of the Heater

Figure 3:
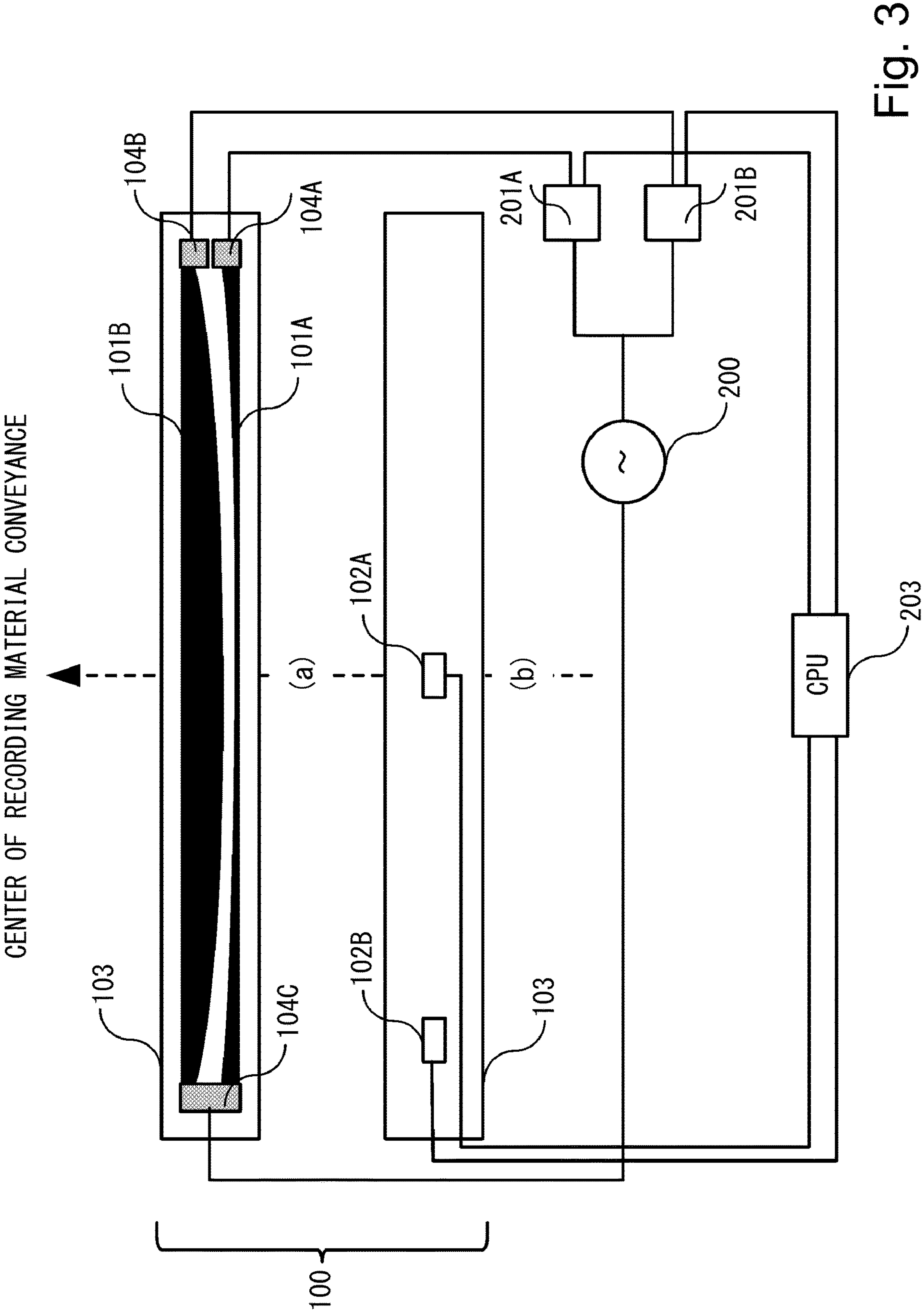
FIG. 3 is a view of a configuration of a heater of the Embodiment.

FIG. 3 is a view of a configuration of the heater 100 of the present Embodiment, and (a) in FIG. 3 is a front surface of the heater 100, which is in contact with the fixing nip portion N side (lower side in FIG. 2), and (b) of FIG. 3 is a back surface of the heater 100, which is an opposite side of the fixing nip portion N side (upper side in FIG. 2).

The heater 100 is provided with a ceramic substrate 103, resistance heat generating members 101A and 101B, which are formed (disposed) on a front surface of the ceramic substrate 103, and electrodes 104A, 104B and 104C, which are formed on end portions of the resistance heat generating members 101A and 101B. In addition, on a back surface of the ceramic substrate 103, the thermistor 102 is disposed.

Specifically, a thermistor 102A, which is a first temperature detecting means, and a thermistor 102B, which is a second temperature detecting means, which are provided at different positions in a longitudinal direction, are disposed on the back surface of the ceramic substrate 103.

For the ceramic substrate 103, alumina formed into a rectangular shape with a thickness of about 1 mm, a width of about 8 mm and a size in a longitudinal direction of about 380 mm is used. Incidentally, the width of the ceramic substrate 103 is a length in the widthwise direction and a length in the conveyance direction of the recording material P. In addition, the longitudinal direction of the ceramic substrate 103 is a length in a direction perpendicular to the conveyance direction of the recording material P and a length in the widthwise direction of the recording material P. In the present Embodiment, the ceramic substrate is used due to thermal capacity thereof, however, it is not limited thereto, and a metal substrate may be used, for example.

The resistance heat generating member 101A, which is a first heat generating member, and the resistance heat generating member 101B, which is a second heat generating member, are alloy mainly composed of silver-palladium, and are formed so that widths thereof continuously vary in the longitudinal direction. The heat generating member 101A and the heat generating member 101B have different heating distribution in the longitudinal direction. The resistance heat generating member 101A is designed so that a heat generation amount becomes larger from both end portions toward a central portion thereof in the longitudinal direction, in other words, so that the width becomes smaller from both end portions toward the central portion thereof in the longitudinal direction. On the other hand, the resistance heat generating member 101B is designed so that the heat generation amount becomes larger from the central portion toward both end portions thereof in the longitudinal direction, in other words, so that the width becomes smaller from the central portion to both end portions thereof in the longitudinal direction.

In the resistance heat generating member 101A and 101B of the present Embodiment, a heat generating member has a length of about 310 mm and a width of about from 2 to 3 mm. Here, the length of the heat generating member is a length in the longitudinal direction and a length in the direction perpendicular to the conveyance direction (widthwise direction of the recording material P). A width of the heat generating member is a length in the widthwise direction and a length in the conveyance direction.

The thermistor 102A is arranged in a center of the resistance heat generating members 101A and 101B in the longitudinal direction. In addition, the thermistor 102B is arranged at a position about 145 mm from the center of the resistance heat generating members 101A and 101B in the longitudinal direction (closer to one end portion). In the image forming apparatus 1 of the present Embodiment, the recording material P is conveyed with reference to the center. Incidentally, in FIG. 3, a portion corresponding to a center of the recording material P is illustrated with a broken line as a center in the recording material conveyance. The thermistors 102A and 102B are connected to the CPU 203, which is a control means of the present Embodiment. The CPU 203 adjusts drive of bi-directional thyristors (hereinafter referred to as triacs) 201A and 201B according to the outputs (detecting results) of the thermistors 102A and 102B. By this, the CPU 203 controls the electric power to be supplied from an AC power source 200 to the resistance heat generating members 101A and 101B via the electrodes 104A, 104B and 104C.

Here, a state of a connection of each portion illustrated in FIG. 3 will be described specifically. One end portion of the resistance heat generating member 101A is connected to the electrode 104A. One end portion of the resistance heat generating member 101B is connected to the electrode 104B. The other end portions of the resistance heat generating member 101A and of the resistance heat generating member 101B are connected to the electrode 104C. The electrode 104A is connected to the AC power source 200 via the triac 201A. The electrode 104B is connected to the AC power source 200 via the triac 201B. The electrode 104C is connected to the AC power source 200.

The CPU 203 is connected to the triac 201A and the triac 201B and controls conduction or non-conduction of the triac 201A and the triac 201B. The thermistor 102A and the thermistor 102B are connected to the CPU 203 and output the detecting results of the temperature of the heater 100 to the CPU 203 (e.g., as voltage).

4. Switching Control in the Present Embodiment

Figure 4:
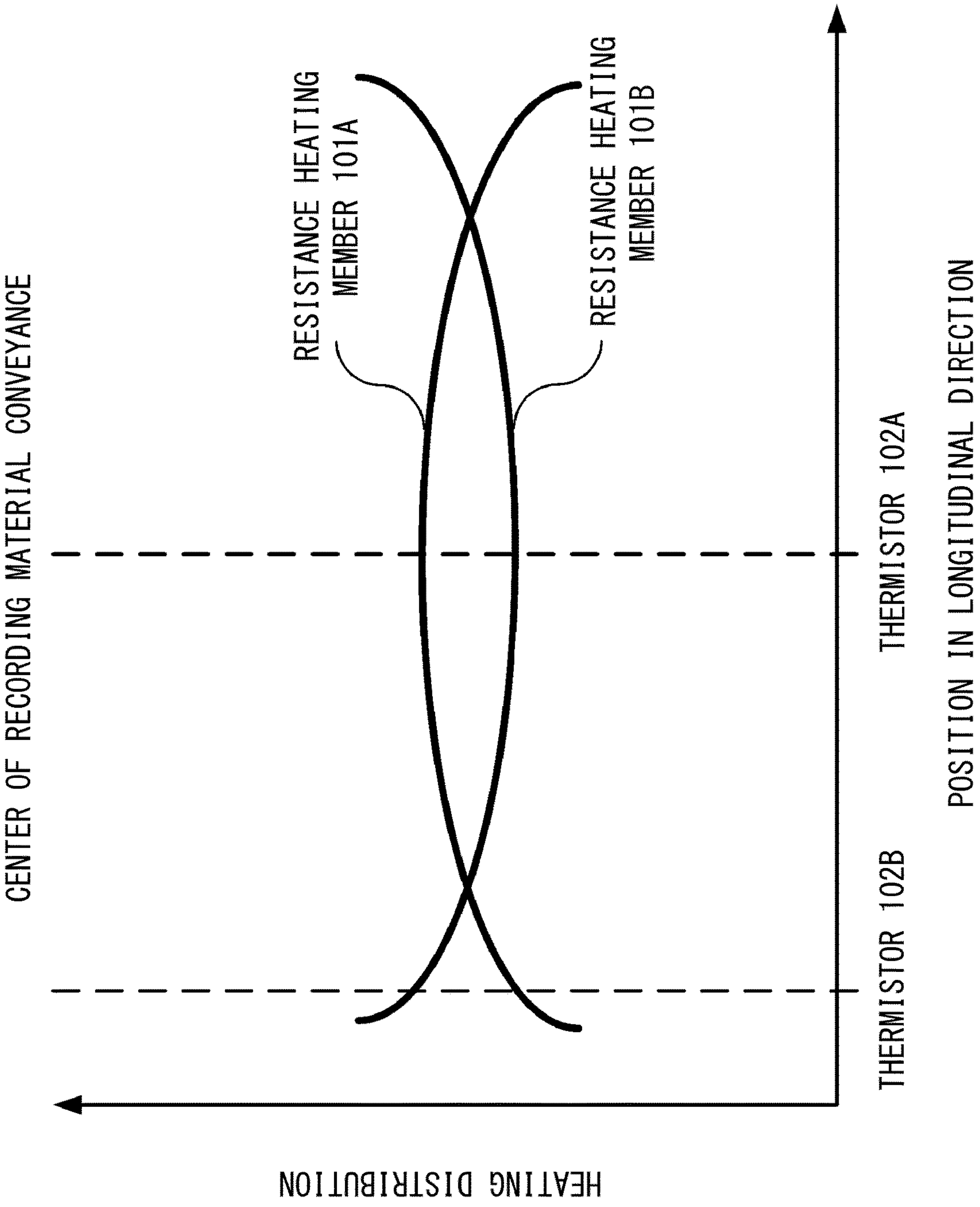
FIG. 4 is a view illustrating heating distribution of resistance heat generating members and positions of thermistors of the Embodiment.

FIG. 4 is a view illustrating the heating distribution of the resistance heat generating members 101A and 101B in the longitudinal direction and the positions of the thermistors 102A and 102B in the longitudinal direction. In FIG. 4, the horizontal axis represents a position in the longitudinal direction, and the vertical axis represents the heating distribution. On the horizontal axis, the center of the conveyance direction of the recording material P (center in the recording material conveyance), the position of the thermistor 102A and the position of the thermistor 102B are indicated by broken lines. In addition, in the vertical axis, it is indicated that the upper as it goes, the greater the heat generation amount is.

The resistance heat generating member 101A is designed so that the heat generation amount becomes larger from both end portions toward the central portion thereof in the longitudinal direction, in other words, so that the width becomes smaller from both end portions toward the central portion thereof in the longitudinal direction. As a result, the resistance heat generating member 101A has the mount-shaped heating distribution peaked at the position of the thermistor 102A as a center. On the other hand, the resistance heat generating member 101B is designed so that the heat generation amount becomes larger from the central portion toward both end portions thereof in the longitudinal direction, in other words, so that the width becomes smaller from the central portion toward both end portions thereof in the longitudinal direction. Therefore, the resistance heat generating member 101B has an opposite shaped heating distribution to that of the resistance heat generating member 101A, with the position of the thermistor 102B as a center. In addition, the heating distribution of the resistance heat generating member 101A and the resistance heat generating member 101B in the longitudinal direction are symmetrical with respect to the center in the recording material conveyance.

In addition, the resistance heat generating members 101A and 101B are configured to have flat (constant) heating distribution for the heater 100 in a case in which the same proportion of the electric power is supplied to the resistance heat generating members 101A and 101B. Therefore, the CPU 203 can change the heating distribution of the heater 100 by controlling the two resistance heat generating members 101A and 101B, which have different heating distribution in the longitudinal direction.

In the present Embodiment, with respect to a control method of the two resistance heat generating members 101A and 101B, the CPU203 switches the control between a case in which the recording material P is passing through the heating device 2 (hereinafter referred to as "during a paper passing") and a case of during a paper interval in which the recording material P is not passing through the heating device 2. Incidentally, the "paper interval" refers to an interval between the trailing end of the recording material P, which is precedingly conveyed (also referred to as a preceding sheet), and the leading end of the recording material P, which is conveyed following the preceding sheet (also referred to as a following sheet), in a situation in which a plurality of the recording materials P are conveyed on a conveyance passage. Acquisition of a switching timing of the control is performed based on the detecting result by the flag 12 described in FIG. 1.

4-1. In the Case During the Paper Passing

In the case during the paper passing, when the recording material P is passing through the heating device 2, the CPU 203 performs the same control as conventional. That is, the CPU 203 changes ratio of the electric power to be supplied to the resistance heat generating member 101B to the electric power to be supplied to the resistance heat generating member 101A (hereinafter referred to as electric power supply ratio) based on the width information of the recording material P. As described above, the CPU 203 acquires the width information of the recording material P from the width sensor 15 in FIG. 1. Incidentally, the width information of the recording material P may be acquired based on information acquired by other means, such as other sensors provided on the conveyance passage or information input from an input portion (not shown) provided to the image forming apparatus 1.

In FIG. 3, the CPU calculates output of the triac 201A (from 0% to 100%) from the following equation, and output of the triac 201B (from 0% to 100%) is determined by multiplying the output by the electric power supply ratio. Incidentally, from 0% to 100% in the output of the triac indicates a percentage of the triac being in conduction in one half-wave of the AC voltage of the AC power source 200. In the present Embodiment, target temperature 1 of the heater 100 is 160° C. and gain 1 is 1 time.

The output of the triac 201A=(the target temperature 1−the temperature of the thermistor 102A)×the gain 1

The output of the triac 201B=the output of the triac 201A×the electric power supply ratio In addition, in Table 1, relationship between the width of the recording material P (hereinafter, referred to as the recording material width) and the electric power supply ratio is shown.

TABLE 1

| Recording material width | Electric power supply ratio |
|---|---|
| 279.4 mm < Recording material width | 1.0 |
| 257 mm < Recording material width <= 279.4 mm | 0.9 |
| 210 mm < Recording material width <= 257 mm | 0.8 |
| 148 mm < Recording material width <= 210 mm | 0.7 |
| 105 mm < Recording material width <= 148 mm | 0.6 |
| Recording material width <= 105 mm | 0.5 |

Relationship between the recording material width and the electric power supply ratio Table 1 is a table showing the relationship between the width of the recording material P and the electric power supply ratio. For example, based on the detecting result of the width sensor 15, the CPU controls the triac 201B as the electric power supply ratio is 1.0 in a case in which the width of the recording material P is greater than 279.4 mm. In addition, for example, based on the detecting result of the width sensor 15, the CPU controls the triac 201B as the electric power supply ratio is 0.7 in a case in which the width of the recording material P is greater than 148 mm and equal to or lower than 210 mm. Furthermore, for example, based on the detecting result of the width sensor 15, the CPU controls the triac 201B as the electric power supply ratio is 0.5 in a case in which the width of the recording material P is equal to or lower than 105 mm.

In this manner, controlling the resistance heat generating member 101A based on the detecting result of the thermistor 102A and controlling the resistance heat generating member 101B using the electric power supply ratio is also hereinafter referred to as to control dependently. In the present Embodiment, as shown in Table 1, the smaller (shorter) the recording material width, the smaller the electric power supply ratio. Incidentally, the information in Table 1 shall be stored in the ROM 204, for example, in advance.

As such, by reducing the electric power supply ratio of the resistance heat generating member 101B to the resistance heat generating member 101A as the width of the recording material P becomes narrower, the heating distribution becomes mount-shaped, i.e., temperature distribution in which temperature of a central portion of the heater 100 is high (see FIG. 4). During the paper passing of a paper having a narrow width (also referred to as a small size paper), since heat generated at end portions of the heater 100 is not transmitted to the recording material P, a phenomenon in which temperature of the end portions of the heater 100 rises (hereinafter referred to as "temperature rise in a non-paper passing portion") occurs. In contrast, in the present Embodiment, when the recording material P is passing, the electric power supply ratio of the resistance heat generating member 101B to the resistance heat generating member 101A is changed based on the width information of the recording material P to suppress the generation of the heat at both end portions of the heater 100. By this, it becomes possible to suppresses the temperature rise in the non-paper passing portion of the heater 100 upon printing the small size paper.

4-2. In the Case During the Paper Interval

The case during the paper interval in which the recording material P is not passing through the heating device 2, i.e., when the width information of the recording material P is not available is a key point of the present Embodiment. In the present Embodiment, the CPU 203 does not perform the control of the resistance heat generating member 101A and the resistance heat generating member 101B using the electric power supply ratio, but controls each of the resistance heat generating members 101A and 101B independently based on the detecting results of the thermistors 102A and 102B.

In FIG. 3, as to the resistance heat generating member 101A, the CPU 203 calculates the output of the triac 201A (from 0% to 100%) from the following formula, and the electric power to be supplied is controlled. In the present Embodiment, target temperature 2 of the heater 100 is 150° C. and gain 2 is 2 times.

The output of the triac 201A=(the target temperature 2−the temperature of the thermistor 102A)×the gain 2

As to the resistance heat generating member 101B, the CPU 203 calculates the output of the triac 201B (from 0% to 100%) from the following formula, and the electric power to be supplied is controlled. In the present Embodiment, target temperature 3 of the heater 100 is 150° C. and gain 3 is 2 times.

The output of the triac 201B=(the target temperature 3−the temperature of the thermistor 102B)×the gain 3

In the present Embodiment, the target temperature 2 and the target temperature 3 during the paper interval are lowered by 10° C. than the target temperature 1 during the paper passing in order for power saving, and in addition, the gain 2 and the gain 3 during the paper interval are twice as high as the gain 1 during the paper passing in order to make temperature change faster. As such, in the case there is no width information of the recording material P, the CPU 203 controls the resistance heat generating member 101A and the resistance heat generating member 101B independently based on the detecting results of the thermistors 102A and 102B. By this, it becomes possible to change the heating distribution of the heater 100 in the longitudinal direction and maintain the temperature distribution in the longitudinal direction uniform.

Thus, in the present Embodiment, the CPU 203 can switch between a first mode and a second mode. Here, the first mode is a dependent mode and a mode in which the temperature of the resistance heat generating member 101A is controlled based on the detecting result of the thermistor 102A, and the temperature of the resistance heat generating member 101B is controlled dependently to the control of the resistance heat generating member 101A. In the first mode, the CPU 203 controls the electric power to be supplied to the resistance heat generating member 101B based on the detecting result of the thermistor 101A and the ratio of the electric power supplied to the resistance heat generating member 101B to the electric power supplied to the resistance heat generating member 101A (electric power supply ratio). The electric power supply ratio is set to be smaller as the width of the recording material P is shorter (see Table 1). The second mode is an independent mode and a mode in which the temperature of the resistance heat generating member 101A is controlled based on the detecting result of the thermistor 102A and the temperature of the resistance heat generating member 101B is controlled independently based on the detecting result of the thermistor 102B. The CPU 203 switches to the first mode while the recording material P is passing through the fixing nip portion N, and switches to the second mode while the recording material P is not passing through the fixing nip portion N.

5. About Switching of Temperature Control

Figure 5:
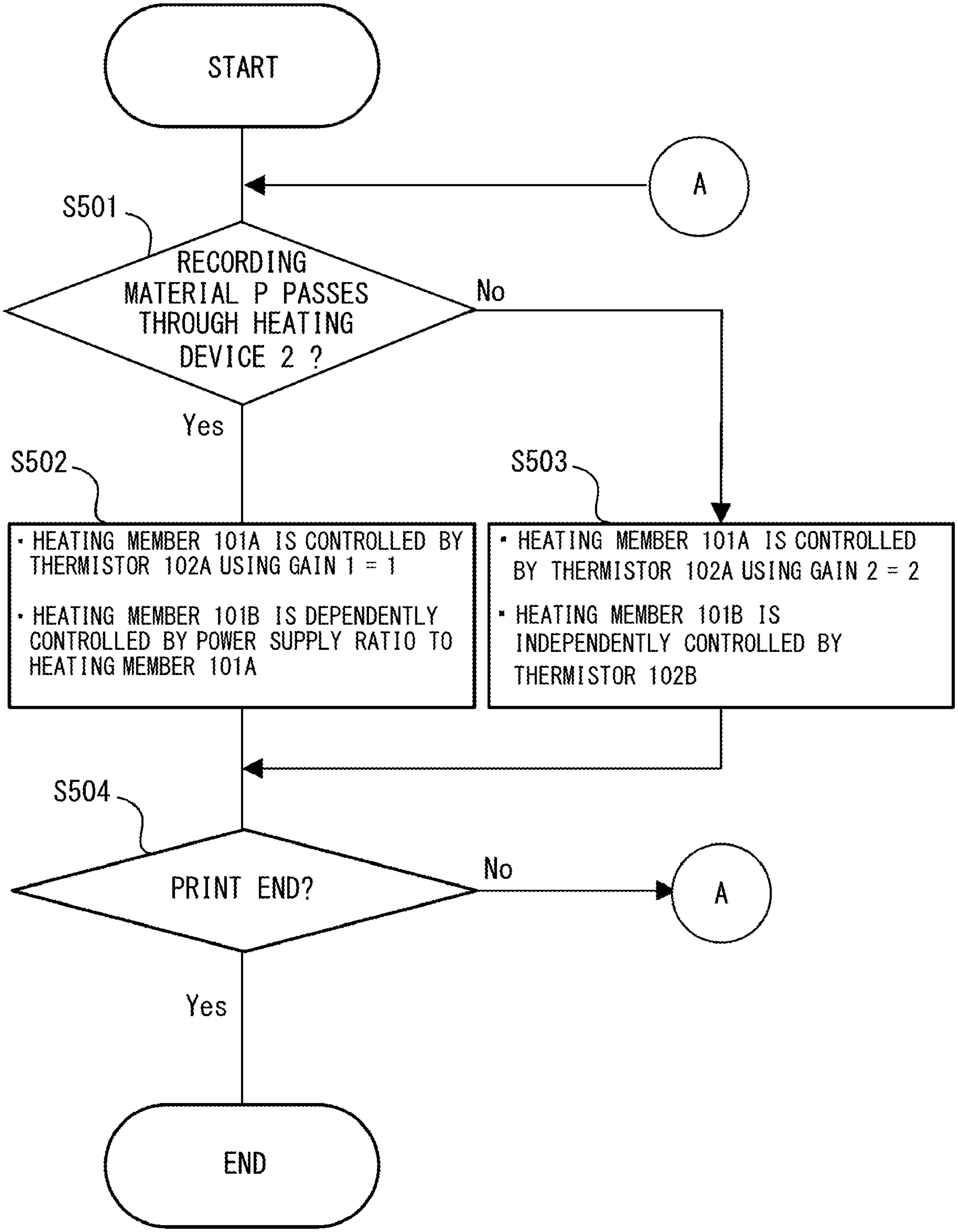
FIG. 5 is a flow chart illustrating switching control of the Embodiment.

FIG. 5 is a flowchart of the present Embodiment illustrating a process for switching temperature control during the paper passing and during the paper interval. Upon receiving the print signal, the CPU 203 performs a step (hereinafter referred to as S) 501 and thereafter.

In S501, the CPU 203 determines whether or not the recording material P is passing through the heating device 2 based on the detecting result of the flag 12. If the CPU 203 determines in S501 that the recording material P is passing through the heating device 2, then proceeds the process to S502. In S502, the CPU 203 controls the resistance heat generating member 101A (more specifically, the triac 201A) based on the detecting result of the thermistor 102A since it is during the paper passing. The CPU 203 then controls the resistance heat generating member 101B (more specifically, the triac 201B) dependently, specifically using the electric power supply ratio, and proceeds the process to S504. In S504, the CPU203 determines whether or not printing of the specified number of sheets has been completed, and if the CPU 203 determines that the printing has not been completed, then returns the process to S501, and if the CPU 203 determines that the printing has been completed, then terminates the process.

In S501, if the CPU 203 determines that the recording material P is not passing through the heating device 2 based on the detecting result of the flag 12, then proceeds the process to S503. In S503, the CPU 203 controls the resistance heat generating member 101A (more specifically, the triac 201A) based on the detecting result of the thermistor 102A since it is during the paper interval. Meanwhile, the CPU 203 controls the resistance heat generating member 101B (more specifically, the triac 201B) based on the detecting result of the thermistor 102B, independently from the resistance heat generating member 101A, and proceeds the process to S504. Incidentally, in the present Embodiment, the state in which the recording material P is not passing through the fixing nip portion N is referred to as the paper interval, however, to the state in which the recording material P is not passing through the fixing nip portion N, a state in which the recording material P is not passing through the fixing nip portion N other than the paper interval may be included. For example, this may include before a first sheet of the recording material P reaches the fixing nip portion N, after a last sheet of the recording material P in the printing has passed through the fixing nip portion N, etc.

If it is during the paper passing in which the recording material P is passing through the heating device 2, the CPU 203 controls the resistance heat generating member 101A based on the detecting result of the thermistor 102A and controls the resistance heat generating member 101B depending to the resistance heat generating member 101A using the electric power supply ratio determined from the width information of the recording material P. On the other hand, if it is during the paper interval in which the recording material P is not passing through the heating device 2, the CPU 203 controls the resistance heat generating member 101A based on the detecting result of the thermistor 102A and controls the resistance heat generating member 101B independently based on the detecting result of the thermistor 102B. By switching the control in this manner, during the paper passing, change in the heating distribution in the longitudinal direction of the heater 100 is made milder to prevent the fixing image from being disturbed. On the other hand, during the paper interval, it is possible to quickly achieve to make the temperature distribution in the longitudinal direction uniform by increasing the change in the heating distribution in the longitudinal direction of the heater 100.

Partial Heat Generation Amount of the Resistance Heat Generating Member

Here, partial heat generation amounts of the resistance heat generating members, which are to be controlled at each position of thermistors 102A and 102B in the longitudinal direction, will be described. In FIG. 4, the partial heat generation amount of the resistance heat generating member 101A (resistance heat generating member to be controlled) relative to the resistance heat generating member 101B (resistance heat generating member not to be controlled) at the position of the thermistor 102A (center) is 1.5 times. On the other hand, the partial heat generation amount of the resistance heat generating member 101B (resistance heat generating member to be controlled) relative to the resistance heat generating member 101A (resistance heat generating member not to be controlled) at the position of the thermistor 102B is 1.5 times.

Here, for example, it is assumed that the partial heat generation amount of the resistance heat generating member 101A (resistance heat generating member to be controlled) relative to the resistance heat generating member 101B (resistance heat generating member not to be controlled) at the position of the thermistor 102A is set to be 1.0 time or less. And the partial heat generation amount of the resistance heat generating member 101B (resistance heat generating member to be controlled) relative to the resistance heat generating member 101A (resistance heat generating member not to be controlled) at the position of the thermistor 102B is set to be 1.0 time or less. In this case, the control on the resistance heat generating member 101A and the control on the resistance heat generating member 101B resonate, and the controls are not independent from each other. Therefore, the partial heat generation amount of the resistance heating element to be controlled is preferable to be 1.1 times or more with respect to the partial heat generation amount of the resistance heating member not to be controlled in respective positions of each thermistor in the longitudinal direction, and in the present Embodiment, it is set to be 1.5 times.

As described above, in the present Embodiment, the resistance heat generating member 101B is controlled with a specific electric power supply ratio to the resistance heat generating member 101A during the paper passing, and the resistance heat generating member 101B is controlled independently from the resistance heat generating member 101A during the paper interval. By this, the temperature distribution in the longitudinal direction of the heater 100 is maintained uniformly. Incidentally, values for the target temperature 1, the target temperature 2, the target temperature 3, the gain 1, the gain 2 and the gain 3 exemplified in the present Embodiment are not limited thereto, but may be changed corresponding to a configuration of the heating device and a type of the recording material, etc.

As described above, according to the present Embodiment, it is possible to maintain the temperature distribution in the longitudinal direction of the heater uniform even when the width information of the recording material is not available.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-052317 was filed Mar. 28, 2023, which is hereby incorporated by reference herein in its entirety.

What is claimed is:

1. A heating device comprising:
a rotatable film;
a heater provided inside the film and including
(a) a first heat generating member having a heat generation amount that increases from both longitudinal end portions toward a central portion, and
(b) a second heat generating member having a heat generation amount that increases from a central portion toward both longitudinal end portions, the heat generation distribution of the second heat generating member being different from that of the first heat generating member in a longitudinal direction;
a pressing roller configured to form a nip portion, with the heater through the film, in which a toner image formed on a recording material is heated to be fixed on the recording material;
a first thermistor provided at a central portion in the longitudinal direction of the heater and configured to detect a temperature of the heater;
a second thermistor provided at an end portion along in the longitudinal direction of the heater and configured to detect a temperature of the heater; and
a controller configured to control the temperature of the heater based on detecting results of the first thermistor and the second thermistor,
wherein the heating device is capable of switching between:
(1) a first mode in which the temperature of the first heat generating member is controlled based on the detecting result of the first thermistor and the temperature of the second heat generating member is controlled depending on the control of the first heat generating member, without using the detecting result of the second thermistor for temperature control, and
(2) a second mode in which the temperature of the first heat generating member is controlled based on the detecting result of the first thermistor and the temperature of the second heat generating member is independently controlled based on the detecting result of the second thermistor, wherein in the second mode, the electric power supplied to each heat generating member is determined based on a target temperature, the target temperatures for the first and second heat generating members are set independently from each other, and the temperature control of the first heat generating member and the second heat generating member is performed with a control gain that is at least twice as large as a control gain used in the first mode, wherein the controller switches to the first mode when the recording material is passing through the nip portion, and the controller switches to the second mode during a period from when a trailing end of a recording material precedingly conveyed passes through the nip portion until when a leading end of a subsequent recording material passes through the nip portion, and wherein the controller sets a target temperature of the heater in the first mode higher than a target temperature of the heater in the second mode, and sets a gain for temperature control of the heater in the first mode smaller than a gain for the temperature control of the heater in the second mode.

2. A heating device according to claim 1, wherein in the first mode the controller controls electric power to be supplied to the second heat generating member based on the detecting result of the first thermistor and a ratio of the electric power supplied to the second heat generating member to an electric power supplied to the first heat generating member.

3. A heating device according to claim 2, wherein the ratio of the electric power is set to be smaller as a width of the recording material, which is a length of the recording material in the longitudinal direction, is shorter.

4. A heating device according to claim 1, wherein the first thermistor is arranged in the central portion in the longitudinal direction, and wherein the second thermistor is arranged at one end portion in the longitudinal direction.

5. A heating device according to claim 1, wherein in the second mode a partial heat generation amount of the heat generating member to be controlled, of the first heat generating member and the second heat generating member, is larger than a partial heat generation amount of the heat generating member not to be controlled in respective positions of the first thermistor and the second thermistor in the longitudinal direction.

6. A heating device according to claim 5, wherein in the first mode the partial heat generation amount of the heat generating member to be controlled is 1.1 times or more with respect to the partial heat generation amount of the heat generating member not to be controlled in respective positions of the first thermistor and the second thermistor in the longitudinal direction.

7. An image forming apparatus comprising:

an image forming unit configured to form an unfixed toner image on a recording material; and a heating device according to claim 1, the heating device being configured to fix the unfixed toner image formed by the image forming unit onto the recording material.

8. An image forming apparatus according to claim 7, further comprising a cassette in which the recording material fed to a conveyance passage is accommodated; and a width detecting unit provided in the cassette and configured to detect the width of the recording material.

9. An image forming apparatus according to claim 8, further comprising a recording material detecting unit provided upstream of the heating device in a conveyance direction of the recording material and configured to detect presence or absence of the recording material, wherein the controller determines whether or not the recording material is passing through the nip portion based on the detecting result of the recording material detecting unit.

* * * * *